United States Patent [19]

Maples et al.

[11] Patent Number: 5,352,332

[45] Date of Patent: Oct. 4, 1994

[54] PROCESS FOR RECYCLING BLEACH PLANT FILTRATE

[76] Inventors: Gerald E. Maples, 4550 Dhadesview Dr., Pensacola, Fla. 32504; Raman Ambady, 3506 Bayswater Dr., Pensacola, Fla. 32514

[21] Appl. No.: 944,327

[22] Filed: Sep. 14, 1992

Related U.S. Application Data

[63] Continuation-in-part of Ser. No. 873,673, Apr. 24, 1992, abandoned, which is a continuation of Ser. No. 646,179, Jan. 28, 1991, abandoned.

[51] Int. Cl.$^5$ .............. D21C 11/04; D21C 11/10
[52] U.S. Cl. .............. 162/30.1; 162/30.11; 162/34; 162/38; 162/60; 162/65; 162/78; 162/89
[58] Field of Search .......... 162/29, 30.1, 30.11, 162/40, 60, 65, 80, 89, 34, 35, 31, 78, 38, 82

[56] References Cited

U.S. PATENT DOCUMENTS

| | | | |
|---|---|---|---|
| 3,698,995 | 10/1972 | Rapson | 162/89 |
| 4,039,372 | 8/1977 | Reeve et al. | 162/89 |
| 4,042,452 | 8/1977 | Arhippainen et al. | 162/89 |

FOREIGN PATENT DOCUMENTS

81-020828  4/1981  Sweden.

*Primary Examiner*—Steve Alvo

[57] ABSTRACT

A process for bleaching wood pulp is provided comprising subjecting the wood pulp, after brown stock washing, to an oxygen delignification stage, a washing sequence, a first chlorine dioxide bleaching stage, an oxidative extraction stage, at least one final chlorine dioxide bleaching stage and then recycling the filtrate from the oxidative extraction stage countercurrently through the bleaching plant and brown stock washing. Additionally, and quite beneficially, the filtrate from the first chlorine dioxide bleaching stage is also recycled countercurrently through the brown stock washing thereby significantly reducing the environmental impact associated with the manufacture of bleach wood pulp.

19 Claims, 4 Drawing Sheets

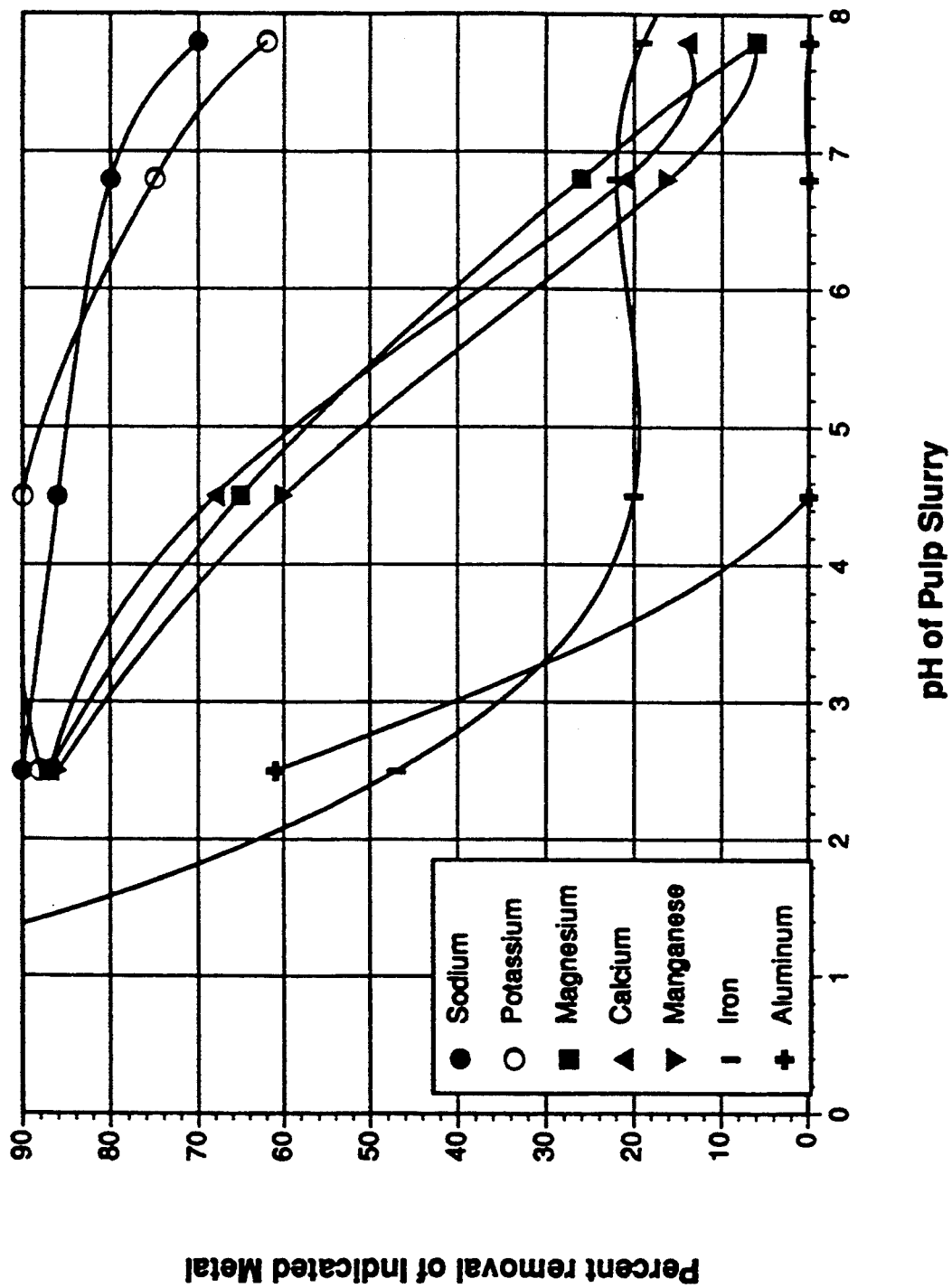

PROCESS FOR RECYCLING BLEACH PLANT FILTRATE

CROSS-REFERENCE TO RELATED APPLICATIONS

This application is a continuation-in-part of application Ser. No. 873,673, filed Apr. 24, 1992, now abandoned, which, in turn, is a continuation of application Ser. No. 646,179, filed Jan. 28, 1991, now abandoned.

FIELD OF THE INVENTION

This invention relates to an improved method for recycling bleach filtrates. More particularly, this invention relates to improvements in the bleaching process including a recycling process for reducing the environmental impact associated with the manufacture of bleached wood pulp.

BACKGROUND OF THE INVENTION

The process of the present invention is applicable to any cellulosic fibrous material but is described with particular reference to the bleaching of wood pulp, preferably wood pulp produced by the Kraft process, i.e., wood pulp produced by digestion of wood chips in the pulping liquor containing sodium hydroxide and sodium sulfide as the active pulping chemicals. Following the wood digestion process, pulp is separated from the spent pulping liquor. The spent pulping liquor is then recovered and regenerated for recycling.

The Kraft process wood pulp is then bleached and purified in a bleach plant operation. In the bleach, plant, pulp is first subjected to oxidizing chemicals such as chlorine and/or chlorine dioxide and followed by extraction with a suitable source of alkali such as sodium hydroxide. Depending on the desired pulp brightness, one to three additional bleaching stages are employed with typically one being an alkali extraction stage and one or two stages using oxidizing chemicals. Following each bleaching stage, spent bleaching chemicals are removed from the pulp by washing with a suitable source of water; either fresh water or previously used water from pulp washing or a combination of the two. Current state of the art requires that all wash water from the bleach plant along with spent bleaching chemicals be discharged to the sewer as effluents rather than being processed in the pulping liquor regeneration operation noted above. Various concerns have prevented the recovery of these bleach plant effluents in the pulping liquor regeneration operation. One concern is the possible build-up of chlorides causing corrosion and operational problems. Another concern is the lack of adequate systems for removing non-process metals, such as calcium, magnesium and manganese, which enter the bleach plant and are typically removed with wash water and spent bleach chemicals.

Further, the use of large volumes of water for pulp washing in the bleach plant has also prevented recovery of bleach plant effluents due to the resulting high evaporator load. The environmental impact of these practices has been widely noted, but despite these serious concerns, the ability to overcome the problems associated with recovery as described above has not been developed.

In the 1970's, the closed mill concept for recovering bleach plant effluents developed by Rapson, U.S. Pat. No. 3,698,995, and later improved by Reeve et al. in U.S. Pat. No. 4,039,372 was tested at Great Lakes Papers in Thunder Bay, Ontario. The mill began operation in 1977 but was abandoned in 1985. The mill attempted to reduce the discharge of the bleach plant effluent by recycling the filtrates to the pulping liquor regeneration process. The bleaching process employed was (D/C)EDED. The process included a salt crystallization system as a means of purging sodium chloride. The chloride levels introduced into the pulping liquor regeneration process were within the range of 90–100 lbs/adt pulp. With the crystallization process, the concentration in white liquor was equal to or in excess of 50 grams per liter before equilibrium was reached, i.e., chloride entering is equal to the amount of chloride removed.

This process was unsuccessful in the recovery of the bleach plant filtrates. The reasons for this were related to continued concerns of corrosion, pulp quality, inadequate removal of non-process metals and high evaporation requirements.

After the experience at Thunder Bay, Reeve noted the following features as needing to be developed for the success of future effluent-free mills: low chloride concentrations in the recovery process; a chloride removal system employing minimal evaporation; low bleach filtrate flow to minimize evaporation requirements, a bleaching sequence that minimizes bleach chemical consumption due to recycle of extracted organic components; and adequate systems to remove minor wood components such as potassium, calcium and pitch.

Substituting chlorine dioxide for chlorine and incorporating oxygen delignification in the bleach sequence reduces the chloride content of the bleach effluent when compared to sequences without oxygen and chlorine dioxide. Use of the ODED sequence, referenced in U.S. Pat. No. 4,039,372, for recovering bleach plant filtrates would reduce the sodium chloride input to the recovery process by 73% over that experienced at Thunder Bay during closed mill operation. While use of the ODED bleach sequence would represent a significant reduction in chloride content of the bleach filtrate streams compared to Thunder Bay's closed mill experience, the resulting chloride content of black liquor feeding the recovery boiler would cause operating problems. The chloride content of black liquor feeding the recovery boiler is a function not only of the quantity of chloride introduced to the recovery process but also the process used to remove chlorides. A significant fraction of the chloride feeding the recovery boiler is the result of chloride accumulation in the ash that is volatilized in the boiler, collected and returned to the boiler feed. Potassium, which also affects recovery boiler operation, accumulates in the boiler ash in a similar manner. At Thunder Bay, sodium chloride was removed from the recovery process by evaporation and crystallization of sodium chloride from white liquor. This chloride removal process not only represents a significant increase in the evaporation load of a mill, it also does not prevent the large cyclic flow of sodium chloride and potassium compounds contained in the recovery boiler ash which represents a significant fraction of the chloride and potassium load to the recovery boiler.

U.S. Pat. No. 4,039,372 by Reeve et al. shows that 1895 gallons per minute of bleach filtrate is recovered from a 500 T/D bleach plant and sent to the pulp mill/recovery operation. All liquor recovered from the bleach plant must be evaporated. The flow of 1895 gallons per minute represents more than twice the normal volumetric flow needed for brown stock washing. According to U.S. Pat. No. 4,039,372, a portion of the 1895 gallons per minute is used for diluting white liquor that is concentrated during the sodium chloride removal operation. The net result is a nearly doubling of the evaporation load of the mill. The most significant factor contributing to the large filtrate flow from the bleach plant in U.S. Pat. No. 4,039,372 is the use of fresh water to wash pulp at two locations in the bleach plant.

Various metals such as calcium, magnesium, manganese and potassium enter the pulp mill with the wood supply. These metals if not adequately purged from the pulping and bleaching operations can cause operating problems. In current operations these metals are released from the pulp in the first acidic stage of the bleach plant due to the low pH (2-3) of operation and are purged to the sewer along with filtrate from this same first stage. Pulp is thoroughly washed as it leaves the first acidic stage of bleaching to prevent any entrained liquor containing solubilized metals from being carried into later stages of bleaching. If not adequately removed in the first acidic stage of bleaching, manganese and iron can affect bleaching in the later stages by limiting brightness development and increasing chemical consumption.

In U.S. Pat. No. 4,039,372, Reeve et al. included a fresh water wash on the first acidic bleaching stage washer which prevents possible carryover of metals to the later stages of bleaching. A second fresh water wash volume was used after the final stage of bleaching. In this manner, two wash volumes of fresh water must be evaporated as compared to evaporation of only one wash volume if bleach plant filtrates are not recovered.

Counter-current pulp washing with bleach filtrates can result in the accumulation of calcium and magnesium in the bleach plant/brown stock washing systems due to adsorption of metals on pulp at high pH and re-dissolving at low pH. This accumulation of calcium and magnesium can result in the deposition of inorganic and organic matter on pulp and equipment which can increase bleach chemical consumption and require down time for equipment cleaning. Reeve et al. described the problems of scaling and lignin deposition if calcium is not removed when practicing the art of recovering bleach filtrates. To avoid this problem Reeve et al. used a portion of the filtrate from the first acidic stage of bleaching in the causticizing plant thereby purging from the bleach plant some of the dissolved metals. This method of purging metals is limited by the volume of filtrate that can be used in causticizing. According to Reeve et al., approximately 325 gallons of the 1288 gallons of first acidic stage filtrate is purged to the causticizing operation or about 25 percent. The remaining 75 percent of the filtrate from the first acidic bleaching stage is used to wash pulp on the decker preceding the bleach plant allowing the possibility for metals to accumulate. Following the experience at Thunder Bay which incorporated this method of purging metals, Reeve noted that additional development would be needed to adequately purge metals for the closed mill concept to be feasible.

When recovering bleach plant filtrates, it is not possible to remove all dissolved organic matter entrained in the pulp from counter-current displacement washing with bleach filtrates, before pulp enters the bleach plant. This is particularly true if fresh water usage is to be limited to keep evaporation requirements to a minimum. Reeve published laboratory results documenting the increased bleach chemical consumption that results as the quantity of dissolved organic matter is increased in the first stage of bleaching of a D-CE sequence at 70% chlorine dioxide substitution. This study showed that bleach chemical consumption increased as dissolved organic matter, removed from pulp in the D-C stage, was re-introduced into the D-C stage, simulating the recovery of bleach plant filtrates. The same conclusions were reached when dissolved organic matter, removed from pulp during the extraction stage, was added to the D-C stage. Bleach chemical consumption increased more for extraction stage organic matter compared to D-C stage organic matter. Competition exists for bleaching chemicals in the first acidic stage of bleaching between dissolved organic matter and lignin within the pulp fibers. As the quantity of organic matter added increases, increasing amounts of bleach chemicals in the first stage are consumed non-productively by the dissolved organic matter. This results in less delignification of the pulp as measured by the pulp kappa number. Following the experience at Thunder Bay, Reeve noted the need for developing a bleaching sequence that minimized bleach chemical consumption due to dissolved organic matter carried into the bleach plant as a result of counter-current displacement pulp washing.

Recently published investigations on recovering chlorine-based bleach plant effluent have concluded that recovery of these effluents along with the pulping liquors in the conventional recovery process is not technically feasible. Others have published investigations on separate recovery operations for pulping liquors and bleach plant effluent.

No process has since been developed that comes close to a substantial recovery of bleach plant filtrates. In fact, based on a recent publication (Paper ja Puu-Paper and Timber; 5/89), several Pulp and Paper Research Institutes in Scandinavia concluded that closure of the bleach plant was not likely to be available technology for at least another decade and would be dependent upon significant developments in both pulp bleaching and in chemical recovery.

It would therefore represent a notable advance in the state of the art if a new process for recovering chlorine-based bleach plant effluents in a conventional pulping liquor recovery operation could be developed which provides very low chloride concentrations in the recovery process; little or no significant impact on evaporation requirements; more complete non-process metal removal; and negligible impact on bleach chemical consumption due to recovery of bleach filtrate.

SUMMARY OF THE INVENTION

The method of the present invention integrates advances in bleaching technology as well as in washing and recovery into a process that permits the substantial closure of the bleach plant while avoiding the problems previously encountered.

The process of the present invention provides for the bleaching of wood pulp and for the recycling and recovery of bleach filtrates in a manner that will allow for: 1) the production of pulp with acceptable brightness and quality; 2) the reduction of dissolved solids normally discharged with bleach effluents including chlorinated organic material; 3) minimal increase in the amount of water required to be evaporated; 4) no increased build-up of chlorides in the pulping liquor regeneration cycle; and 5) removal of non-process metals to prevent scale formation.

The process of the present invention accomplishes the foregoing objectives by the following combination of sequences:

A bleaching sequence which provides a minimal chloride content of the recovered filtrates is effected by minimizing first the requirements for molecular chlorine and secondly chlorine dioxide. This is accomplished preferably with the use of oxygen delignification of either softwood or hardwood pulps obtained from the Kraft pulping process. After significant lignin reduction is achieved with the oxygen delignification system, the pulps are then treated successively with a chlorine dioxide (D) stage, a peroxide reinforced oxidative extraction (EOP) stage, and at least one final chlorine dioxide (D) stage. The first acidic bleach stage can be 100% chlorine dioxide, chlorine dioxide with 10% or less molecular chlorine added or ozone. The final treatment can be either one stage (preferably for the production of 80-88 brightness targets) or two stages (preferably for the production of 90+ brightness).

The first chlorine dioxide stage is preferably operated at medium consistency; i.e., within the range of 8-14% and at a reduced pH of 2-2.5.

An acid treatment stage is preferably introduced after oxygen delignification. The acid treatment stage is preferably placed after oxygen delignification and before the first chlorine dioxide stage. This stage is introduced for the purpose of removing non-process metals such as potassium, magnesium, calcium, manganese, iron, aluminum, and the like.

The pulp from the first chlorine dioxide stage is neutralized by mixing with the extraction stage filtrate. This neutralization allows for the degassing of the pulp which enhances the effectiveness of the decker which follows it, thereby allowing for a more effective operation. Also, this neutralization effectively utilizes residual alkali in the extraction stage filtrate and combines the filtrates from the first chlorine dioxide and extraction stages.

Recycling of the combined acid filtrate from the first chlorine dioxide stage and the caustic extraction stage filtrate is conducted in a countercurrent fashion back through post oxygen delignification and brown stock washing. The organic solids from these filtrates are eventually processed in the mills' recovery boiler where they are destroyed through combustion. This recycling is accomplished with only an 8 to 10% increase in evaporator loading.

Removal of sodium chloride from the recovery boiler is accomplished preferably through the collection of the catch from the electrostatic precipitator followed by an aqueous leaching of this catch to allow for the separation of salt cake and sodium chloride. The salt cake is recycled back to the black liquor feed and the chloride-rich aqueous material is sewered.

By combining these various steps, the present invention allows for a significant reduction in color, AOX, BOD and solids discharged in the effluent associated with bleaching of chemical pulp to a degree that represents a significant improvement relative to current practice. Furthermore, the present invention accomplishes this in a manner that represents a significant improvement over previously developed techniques that attempted various approaches for bleach filtrate recovery.

BRIEF DESCRIPTION OF THE DRAWINGS

FIGS. 3 and 4 depict, in graphic form, the percent removal of various metals from hardwood and softwood pulps as a function of the pH in the acid treatment stage.

DETAILED DESCRIPTION OF THE INVENTION

Figure 1:
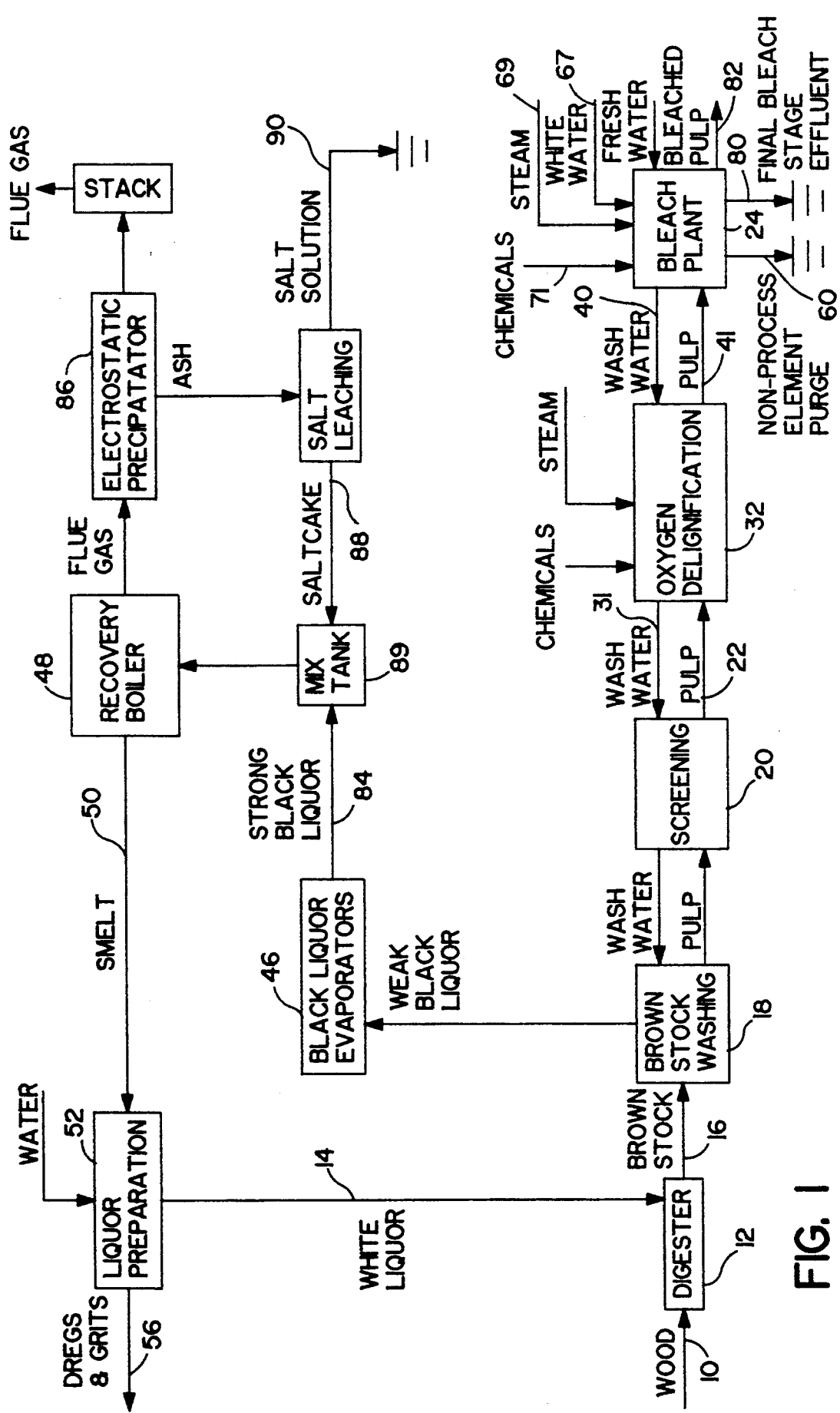
FIG. 1 is a schematic illustration of the overall pulp making and chemical recovery processes in accordance with the present invention.

The process of the present invention overcomes the previously encountered problems of high chloride concentration in the recovery process by maintaining chloride concentration at or near current operating conditions of typical "inland mills". The process of the present invention achieves this low chloride concentration in the recovery process by limiting chloride input to the recovery process with bleach plant filtrates and reducing the cyclic flow of chloride typically contained in the boiler ash.

Chloride input to the recovery process is limited by reducing the amount of chlorine-based bleach chemicals used in the bleach plant. In one instance, use of chlorine-based chemicals is reduced in the first chlorine dioxide stage by incorporating stages of oxygen delignification, 100% chlorine dioxide substitution and hot oxidative extraction with peroxide into the process. Chloride input to the recovery process is also reduced by recovering only the filtrates from the first chlorine dioxide stage and extraction stage in the OD(EOP)D bleaching sequence.

The present process recovers only the filtrates from the first chlorine dioxide stage and EOP stage. The final chlorine dioxide stage filtrate is not recovered as this would more than double the quantity of chloride sent to the recovery process for only a 10% to 15% reduction in the environmental impact of the bleach plant effluent.

The final chlorine dioxide stage filtrate instead can be recovered by incorporating new cooking techniques such as extended modified continuous cooking or rapid displacement heating methods for batch cooking and enzyme prebleaching. By incorporating these techniques the total chloride in all filtrates of the OxD-(EOP)D bleaching sequence is reduced such that recovery of all filtrates can be achieved while maintaining chloride concentrations of current "inland" mills. Complete recovery of bleach plant filtrates can be accomplished by replacing the hot wash water used on the (EOP) stage washer with filtrate from the final chlorine dioxide stage washer.

Chlorides feeding the boiler and circulating in the liquor cycle are greatly reduced by incorporating a system to remove chloride from the boiler ash. Sodium chloride has a significant vapor pressure at the operating temperatures of the boiler and as such chloride feeding the boiler is preferentially distributed in the boiler ash. Ash, being re-dissolved in black liquor and fed to the boiler, creates a significant cyclic flow of chloride. The subject process avoids this cyclic flow of chloride by removing chloride from the ash before it is re-introduced to the boiler. The process also provides significant benefit in the removal of potassium from the liquor cycle. The removal of chloride and potassium provides significant benefit to the recovery boiler operation.

By limiting the amount of chlorine dioxide used in the bleach plant, which limits the chloride introduced into the pulping liquor cycle, and avoiding the cyclic flow of chloride contained in the boiler ash, the chloride concentration in the pulping liquor cycle and feed to the recovery boiler is maintained at normal levels. Typical chloride concentrations in white liquor and feed to the recovery boiler are contrasted in Table 1 for four mills. A typical "inland mill" is one that does not transport their wood supply via sea water. The "coastal mill" is one that does use sea water for wood supply transportation, such as some mills on the west coast of Canada. Results from the Thunder Bay mill are reported literature values when that mill operated with the closed mill concept. The results for mills operating according to the present invention are calculated for an "inland mill" operating with the bleach filtrate recovery process shown in FIG. 1 and FIG. 2. As shown in Table 1, the process of the present invention reduces the chloride input to the liquor recovery operation by about 90% over that described by Reeve et al in U.S. Pat. No. 4,039,372.

Figure 2:
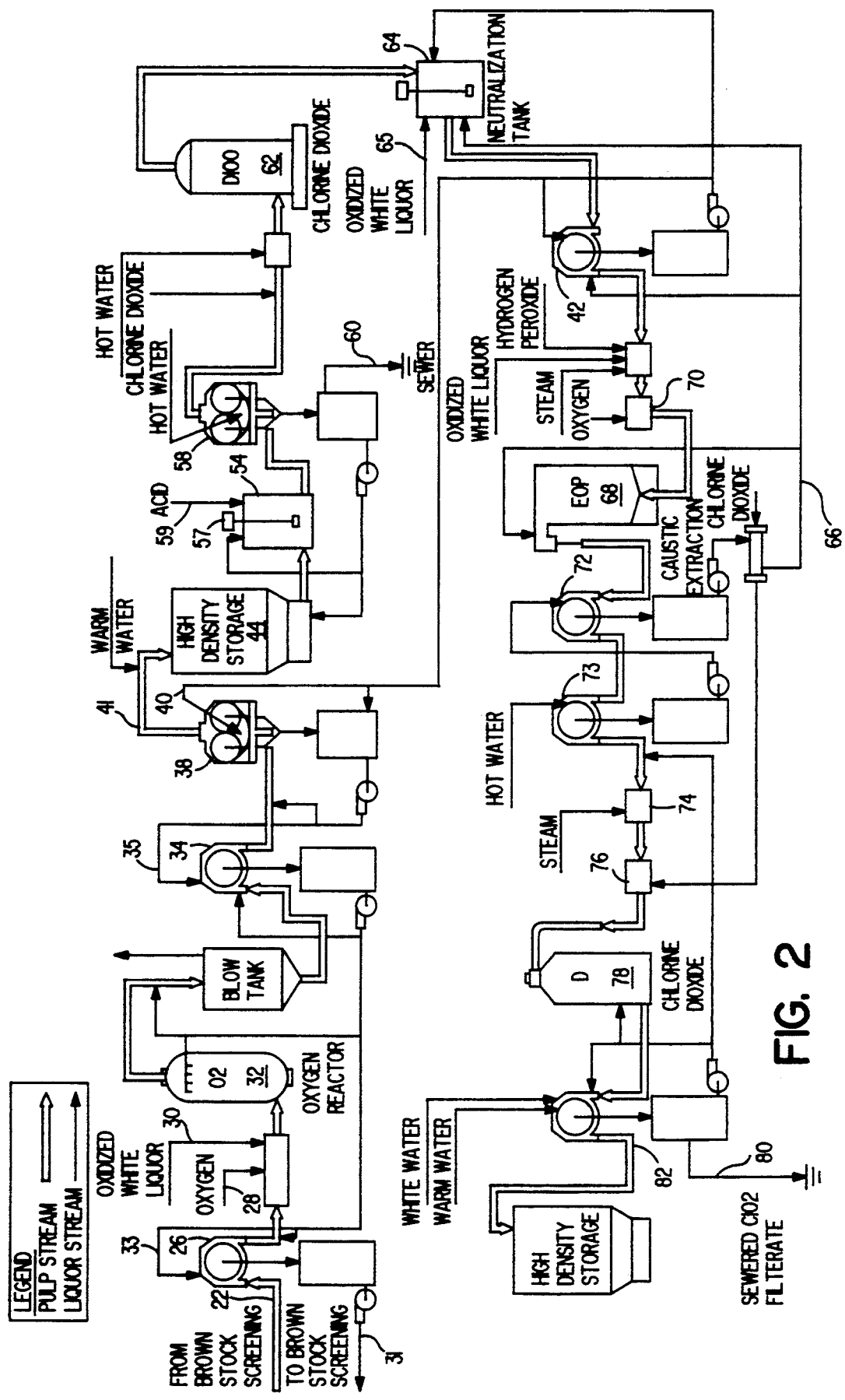
FIG. 2 is a schematic illustration of the bleach plant operation including the filtrate recycling process of the present invention.

The present invention also provides a method for removing metals. In one embodiment, the present process uses an acid treatment step to remove metals as illustrated in FIG. 2. An alternate process for removing metals (not illustrated) utilizes sodium carbonate and/or sodium hydroxide and/or green liquor from the pulping liquor recovery process to cause metal carbonates and metal hydroxides to precipitate from a portion of the first acidic bleach stage filtrate.

Figure 3:
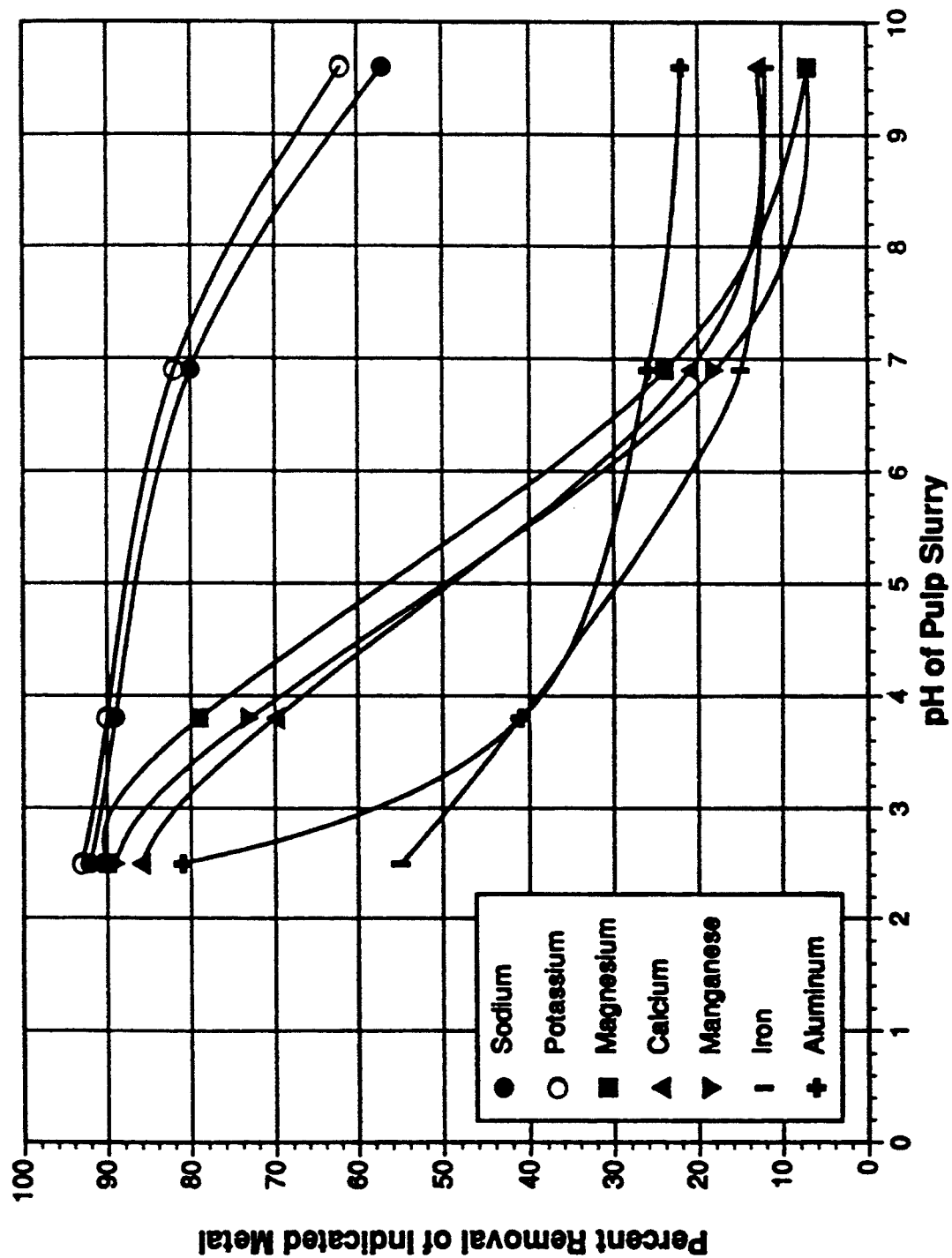

According to FIG. 2, an acid treatment stage is located after post oxygen delignification washing. The entire pulp stream is first acidified to about 2 pH and then washed before it enters the chlorine dioxide stage of bleaching. Wash water from the acid treatment washing along with the solubilized metals are discharged to the sewer. FIGS. 3 and 4 illustrate the percent removal of various metals from hardwood and softwood pulps at different pH values in the acid treatment stage. Nearly complete removal of troublesome metals such as calcium, magnesium and manganese is effected in this manner. With the acid treatment system, described above and shown in FIG. 2, metals are removed before filtrates are recycled thereby overcoming all of the problems associated with metals noted previously. In addition, by using the acid treatment stage, the need for a fresh water wash on the first acidic bleach stage washer to prevent metals from being carried into later bleaching stages is eliminated. Eliminating the need for a fresh water wash on this first acidic stage avoids additional evaporation requirements. Wash water used to wash the acid treated pulp is discharged to the sewer rather than being evaporated.

Location of the acid treatment stage after oxygen delignification and post oxygen washing is critical in enhancing the recovery of spent chemicals and dissolved organic matter from the wood pulp. This improved recovery is illustrated in Table 2 which shows how sewer losses vary if the acid treatment process is located before oxygen delignification versus after oxygen delignification. Percent metal removal is the same regardless of location. As shown in Table 2, nearly 25 times as much color and 40 times as much total organic carbon (TOC) is lost to the sewer if the acid treatment is placed before oxygen delignification rather than after oxygen delignification. At high chlorine dioxide substitution the entire softwood bleach plant discharges about 50 to 60 #/T color. Placement of acid treatment before oxygen delignification would nearly negate the environmental benefit of recovering bleach filtrates.

The process of the present invention is described here and shown in FIG. 2 for medium consistency operation in the first chlorine dioxide stage of the OD(EOP)D sequence. The present process is equally applicable for low consistency operation in the first chlorine dioxide stage by removing the neutralization step shown in FIG. 2 and recycling chlorine dioxide filtrate from the first stage to the discharge of the high density storage tower as dilution to low consistency. In this case some extraction stage filtrate is used as a displacement wash on the first chlorine dioxide stage washer with the remaining extraction stage filtrate being used as displacement wash on the last post oxygen stage washer.

Metals can also be removed by an alternate process which precipitates metals as carbonates and hydroxides. Metals, which enter the bleach plant absorbed to pulp at high pH, are dissolved in the low pH aqueous solution of the first acidic bleaching stage. Any fraction of the aqueous filtrate from the first acidic stage of bleaching can be treated in the precipitation process; however, 25% is adequate to remove sufficient quantity of metals to prevent their detrimental effects on bleaching and scale deposition.

In this metal precipitation embodiment a fraction of the first acidic filtrate is treated with sodium hydroxide and/or sodium carbonate, or green liquor from the pulping process, sufficient to raise the pH between 9 and 11 and provide an amount of carbonate ion such that insoluble metal carbonates and hydroxides will be formed. The aqueous solution is maintained for 10 minutes at a temperature of from about 130° F. to about 160° F. Under these conditions, with adequate carbonate ions present, insoluble metal carbonates and hydroxides of calcium, magnesium, manganese and iron precipitate from the aqueous solution.

A suitable separation device, preferably a precoat filter or a clarifier, is used to separate the aqueous phase from the solid precipitate. The solid precipitate can then be disposed of by landfill or introduced into the pulping liquor cycle either with heavy black liquor before combustion in the recovery boiler or with green liquor. If the precipitate is introduced into the pulping cycle, the non-process metals will be removed from the mill along with other nonprocess metals in the current practice of grits and dregs removal.

The aqueous phase from the separation device is then preferably reused in the bleaching operation. This aqueous phase is relatively free of metals and can be used in the first acidic bleach stage washer to displace entrained liquor containing metals. This method of washing pulp with metal free filtrate reduces the quantity of metals carried into the extraction stage without the use of fresh water. Use of filtrate from the metal removal system is not limited to washing after the first acidic bleach stage. It can also be used for pulp dilution prior to the high density storage or for washing pulp prior to bleaching.

Table 3 illustrates the results of a water balance around the bleach plant for a 500 T/D pulp mill incorporating the process illustrated in FIG. 1. The recovered filtrate volume from the bleach plant is 515 gallons per minute (stream 40 in FIG. 1). This represents approximately an eight to fourteen percent increase in evaporation load as compared to a 500 T/D pulp mill that does not recover bleach filtrates. The reduced evaporation load of the present process compared to the processes of the prior art is the result of less water usage in the bleach plant. The reduced water usage in the present process results from the use of two extraction stage washers and avoiding the need for fresh water on the chlorination stage washer to wash the pulp free of entrained metals. Use of two extraction stage washers allows a reduced shower flow to achieve the same degree of washing.

In the present process, combined filtrates from the first chlorine dioxide stage and extraction stage are recycled counter-currently to pulp flow for the purpose of reducing the entrained black liquor from being carried into the first chlorine dioxide stage (see FIG. 2). While this displacement washing process prevents black liquor from being carried into the first chlorine dioxide stage, organic matter from the combined filtrates, used to displace black liquor, are carried into the first chlorine dioxide stage. Carryover of the combined bleach filtrates can be reduced by squeezing the pulp to high consistency and/or careful use of fresh water for pulp washing. Limiting the amount of organic matter carried into the first stage of bleaching will reduce the bleach chemical consumption by organic matter.

When organic matter from the combined filtrate (D100+EO) of the present process is added to the first chlorine dioxide stage a small amount of chlorine dioxide is consumed by the dissolved organic matter. This results in reduced delignification in the first chlorine dioxide stage as shown in Table 4 by the increased kappa number as the amount of added organic matter increases. However this loss of delignification in the first chlorine dioxide stage may be corrected by oxygen in the oxidative extraction stage as evidenced by the constant extracted kappa numbers shown in Table 4. Bleach chemical consumption by carryover of dissolved organic matter in the first acidic bleach stage is further reduced by complete substitution of chlorine dioxide for chlorine. Also contributing to the low chemical consumption in the first acidic stage of bleaching, by dissolved organic matter, is the highly oxidized nature of the organic matter having been exposed to oxygen and peroxide in the extraction stage. This means that for a given extracted kappa number, carryover of organic matter from the combined filtrate (D+EOP) of the present process into the first chlorine dioxide stage will not increase bleach chemical consumption.

The present process thereby avoids any increase in bleach chemical consumption due to the presence of dissolved organics by incorporating oxygen and/or peroxide in the extraction stage of the bleach plant. In this manner one of the difficulties encountered while practicing the art of recovering bleach plant filtrates, as described in U.S. Pat. No. 4,039,372, is unexpectedly avoided.

DESCRIPTION OF THE PREFERRED EMBODIMENTS

Referring to FIG. 1, Southern Pine Softwood (hardwood) Chips 10 are screened (not shown) to remove oversized and undersized chips, then cooked in a digester 12 using the Kraft pulping process with a white liquor 14 charge of from about 15 to 22%, and preferably 18%, active alkali and about 20 to 40%, preferably about 30%, sulfidity under cooking conditions of about 310° to about 350° F., and preferably about 344° F., and from about 80 psi to about 140 psi, and preferably about 110 psi.

The resulting pulp having a Kappa number ranging from about 25 to about 35, and preferably about 30, is discharged under pressure into a blow tank (not shown), then screened to remove uncooked knots (not shown). After removal of knots, the brown stock 16 is washed successively with from two to four stages, and preferably three stages of washing. After washing, pulp is screened 20 to remove rejects and the resulting pulp 22 is then charged to the oxygen delignification stage 32.

As best shown in FIG. 2, the pulp, after brown stock washing and screening, is shown entering the last wash stage 26 prior to entering the oxygen delignification stage 32, wherein it is admixed with oxygen 28 and oxidized white liquor 30 and then further delignified in an oxygen delignification stage 32 to a Kappa number ranging from about 14 to about 20, and preferably about 16, corresponding to about 30 to about 55%, and preferably about 45%, delignification. The oxygen delignification stage 32 is run under conditions of temperature (180°–210° F.) and pressure (90–100 psi) with alkali supplied in the form of the oxidized white liquor 30.

Following oxygen delignification, the pulp is again washed successively with from 2 to 4 stages of washing (shown as 34 and 38) to remove the lignin and inorganic materials. The wash water 35 is derived from the washings from the next subsequent wash stage 38. The final wash is derived from filtrate 40 obtained from the decker 42 after the first bleach stage as described hereinbelow. The resulting washed pulp is then stored in a high density (10–12%) storage vessel 44.

The filtrates from the post oxygen delignification washers, 34 and 38, are recycled back countercurrently as wash water through the pre-oxygen delignification washer 26 as best seen in FIG. 2. All of the organic and inorganic materials are eventually concentrated through a train of black liquor evaporators 46 and sent to the recovery boiler 48 for combustion, as shown in FIG. 1.

As best seen in FIG. 1, the inorganic salts, recovered as smelt 50, are dissolved in water to form green liquor in liquid preparation 52, which in turn is treated with calcium oxide to regenerate the white liquor 14 fed to the digester 12. The calcium carbonate byproduct is burned in a kiln (not shown) expelling carbon dioxide and regenerating calcium oxide which is used to regenerate the white liquor.

Throughout the pulping (including oxygen delignification), washing and recovery processes, no organic or inorganic materials are intentionally discharged and/or disposed of, with the exception of the small amount of dregs that settle out in the green liquor clarifier and grits from the green liquor shaker (not shown).

Returning now to FIG. 2, the pulp from high density storage 44 is then subjected to an acidification treatment in tank 54 equipped with mixer 57. The pulp can be treated with sulfuric acid, hydrochloric acid, nitric acid or the like to a pH within the range of from about 2 to about 3 entering tank 54 through a line 59. The primary function of the acidification treatment is to solubilize the non process metals that come in with the wood supply and which must be purged from the process. In the past, this typically was done in the first acidic bleaching stage where the filtrate was discharged to the sewer. By adding an acidic stage with no ability to delignify, the metals can be removed and thereby allow the first acidic bleaching stage with its content of solids (color, BOD, etc.,) to be recovered. By acid treating the pulp from the high density storage not only are the metals removed but most of the dissolved organics associated with the pulp slurry will be precipitated onto the fibers and will be carried into the first bleaching stage rather than discharged with the metals to the sewer. This is preferred to significantly reduce the discharge of dissolved organics. Accordingly, it can be seen that the acidification treatment step prevents the build-up of metals within the brownstock washing/bleach plant cycle which would otherwise limit the viability of the process.

After acidification, the pulp is washed in washer 58 with fresh water to remove the acidic wash and the non-process metals. This wash, which is low in environmental impact since no bleaching or delignification is effected, is discharged to the sewer at 60.

After the acid treatment and wash, chlorine dioxide or a mixture of chlorine dioxide and chlorine is added to the pulp at an application rate of about 2.0 to 3.4%, preferably about 2.6%, calculated as active chlorine. The pulp is treated with the chlorine dioxide or a mixture of chlorine dioxide and chlorine solution in the first bleaching stage 62 under conditions of 10–12% consistency, a reaction time ranging from about 30 to about 90 minutes, preferably about 60 minutes, and a temperature ranging from about 100 to about 160° F., preferably about 140° F. Although chlorine can be added along with the chlorine dioxide in the first bleaching stage, it is considered important in achieving a bleaching stage with minimal chloride residuals to limit the use of chlorine to less than about 10%, or completely eliminate the use of molecular chlorine.

After the first bleaching stage, the pulp is then discharged into a mixing tank 64 for partial neutralization to a pH ranging from about 5 to about 7, and preferably to about 7, using the alkaline filtrate 66 from the first oxidative extraction stage 68 with some caustic make-up in the form of oxidized white liquor 65, generally less than 1% on pulp. The pulp is then thickened by passage over decker 42 and oxidized white liquor is added at an application rate of about 1 to about 2%. Hydrogen peroxide is then introduced to the stream from the decker and oxygen is added to the pulp through high intensity mixer 70. Additional delignification is thus accomplished in oxidative extraction stage 68 thereby producing a pulp with a Kappa number ranging from about 2 to about 6, and preferably about 4. The pulp is then diluted at the oxidative extraction tower discharge using a portion of the filtrate 66 from the first post extraction stage washer 72. Following the oxidative extraction stage 68, the pulp is washed successively on two conventional rotary drum washers 72 and 73. The pulp is then heated by steam in a steam mixer 74 and chlorine dioxide is added in a high intensity mixer 76 and allowed to react in the chlorine dioxide bleaching tower 78 at a temperature ranging from about 150° to about 180° F., and preferably about 160° F., for from about two to about four hours, and preferably for about three hours.

The bleached pulp is then washed using paper machine white water with a portion of the filtrate being sewered at 80 and not recovered within the process. The remaining portion of the filtrate can be recycled to the chlorine dioxide bleaching tower 78 for pulp dilution. Thus, from the bleach plant 24, the only intentional discharges are flows from the acid pretreatment stage at 60 and from the final wash applied to the fully bleached pulp at 80.

Filtrate, from washing pulp exiting the oxidative extraction stage 68, is used, in part, for discharge dilution of the pulp from the oxidative extraction tower 68 by way of line 66, and in part, is used for neutralization of the pulp exiting the first bleaching stage 62 in neutralization stage 64. Addition of fresh water to wash the pulp after the extraction stage is reduced by using two stages of washing and as such is preferred to reduce, if not eliminate, additional evaporator requirements. Thus two stages of washing after the oxidative extraction stage is an important element to the viability of this process.

As shown in FIG. 2, filtrate 40 is produced when decker 42 thickens the pulp received from the neutralization stage 64. Filtrate 40, which is a combination of filtrate from the first chlorine dioxide stage and extraction stage, is used as wash water in the last post-oxygen delignification washer 38. The filtrate 35 from the last post oxygen delignification washer 38 is, as discussed, hereinabove, recycled countercurrent to pulp through washers 34 and 26 via lines 35 and 33. As shown in FIG. 1, filtrate 31 from washer 26 flows countercurrent to pulp through screening 20 and brown stock washing 18. In this way, chlorides, spent bleaching chemicals and organic matter removed during bleaching are combined with spent pulping liquor and evaporated producing strong black liquor 84.

Chloride from the bleach plant, contained in black liquor 84 feeding the recovery boiler 48, is partially volatilized in the recovery boiler and carried to the electrostatic precipitator 86 where it is collected and removed with salt cake in the precipitator ash. This ash is dissolved with water in the salt leaching process at a temperature ranging from about 80° to about 120° F., and preferably about 100° F., to separate out sodium sulfate from sodium chloride. The aqueous sodium chloride solution is sewered at 90 and the solid sodium sulfate 88, with some residual chloride is recycled back to the mix tank 89. The leaching process prevents the build up of chloride concentration in the liquor cycle and maintains the concentration of sodium chloride in the white liquor at less than 5 grams per liter.

The leaching process as described herein operates at greater than 95% efficiency in terms of salt cake recovery.

Moreover, and most importantly, the improved process of the present invention wherein the filtrate from the peroxide reinforced oxidative extraction (EOP) stage is recycled countercurrently through the bleach plant and brown stock washing and most preferably, wherein additionally, the filtrate from the first chlorine dioxide bleaching stage (D) is also recycled countercurrently through the brown stock washing, significantly reduces the color, AOX and BOD in the bleach plant effluent as shown in Table 5 wherein the effects of chlorine dioxide substitution for molecular chlorine and the effect of the filtrate recycle in accordance with the present invention are shown.

TABLE 1

| COMPARISON OF TYPICAL CHLORIDE CONCENTRATIONS FOR VARIOUS MILLS | | | |
|---|---|---|---|
| IN-LAND MILL | COASTAL MILL | THUNDER BAY MILL | PRESENT MILL |
| NaCl in White 3–6 | 25–50 | 50 | 4.5 |

TABLE 1-continued
COMPARISON OF TYPICAL CHLORIDE CONCENTRATIONS FOR VARIOUS MILLS

|  | IN-LAND MILL | COASTAL MILL | THUNDER BAY MILL | PRESENT MILL |
|---|---|---|---|---|
| liquor, grams NaCl/liter |  |  |  |  |
| NaCl to Recovery Boiler, % of B.L. Solids | 0.2–0.5 | 6.1 | 6.0 | 0.45 |
| NaCl to recovery process, pounds NaCl per ton pulp | 1–3 | 11–36 | 115 | 10–12 |

TABLE 2
COMPARISON OF SEWER DISCHARGE FROM ACID TREATMENT OF SOFTWOOD PULP BEFORE AND AFTER OXYGEN DELIGNIFICATION

| BEFORE OXYGEN DELIGNIFICATION TO SEWER | | | | AFTER OXYGEN DELIGNIFICATION TO SEWER | | | |
|---|---|---|---|---|---|---|---|
| $H_2SO_4$ % | pH | TOC #/T | Color #/T | $H_2SO_4$ % | pH | TOC #/T | Color #/T |
| 9.1 | 2.1 | 41.2 | 48.8 | 2.0 | 2.3 | 0.9 | 2.0 |

TABLE 3
WATER BALANCE 500 T/D BLEACH PLANT WITH BLEACH FILTRATE RECOVERY (FIG. 1)

| Stream No. | Flow (gpm) |
|---|---|
| 40 | 515 |
| 41 | 148 |
| 60 | 826 |
| 63 | 1561 |
| 67 | 735 |
| 69 | 41 |
| 71 | 104 |
| 80 | 804 |
| 82 | 557 |

TABLE 4
EFFECT ON CHLORINATION AND EXTRACTED KAPPA NUMBERS WHEN ORGANIC MATTER IS ADDED TO THE CHLORINATION STAGE
(Combined Filtrate (D100 + EO) From Bleach Filtrate Recovery Added to First D Stage of OD(EO)D Sequence)

| Added Organic Matter % TOC on Pulp | D100 Kappa | Extracted Kappa |
|---|---|---|
| 0 | 6.3 | 4.1 |
| 0.145 | 6.6 | 4.0 |
| 0.29 | 7.0 | 4.3 |
| 0.44 | 7.1 | 4.2 |

TABLE 5
BLEACH PLANT EFFLUENT CHARACTERISTICS

| BLEACH SEQUENCE | COLOR | AOX | $BOD_5$ |
|---|---|---|---|
| O(C + $D_{10}$) (EO)D | 120 | 8 | 30 |
| O($D_{50}$/C) (EO)D | 90 | 4 | 25 |
| OD(EO)D | 50 | 2 | 20 |
| OD(EO)D | 10 | 1 | 10 |
| OD(EO)D | 1 | 0.1 | 2 |

All values in lbs/ton

TABLE 6
ACID LEACHING OF OXYGEN DELIGNIFIED PULPS

| | Metals in Softwood Pulp, ppm | | | | | | | Metals in Hardwood Pulp, ppm | | | | | | |
|---|---|---|---|---|---|---|---|---|---|---|---|---|---|---|
| | Na | K | Mg | Ca | Mn | Fe | Al | Na | K | Mg | Ca | Mn | Fe | Al |
| As is | 2765 | 273 | 572 | 1358 | 66 | 11 | 26 | 6498 | 667 | 382 | 2529 | 88 | 16 | 22 |
| After leaching | 124 | 32 | 29 | 66 | 4 | 6 | 9 | 180 | 30 | 15 | 97 | 4 | 7 | 5 |
| % Removed | 95 | 88 | 94 | 95 | 93 | 54 | 65 | 97 | 96 | 96 | 96 | 95 | 56 | 77 |

TABLE 7
Laboratory Bleaching of Oxygen Delignified Softwood Pulp With and Without Bleach Plant Filtrate Recycle Kappa number after oxygen delignification 14.2; Viscosity 15.1 cp.

| | Without Recycle | With Recycle |
|---|---|---|
| First Chlorine Dioxide State | | |
| Chlorine dioxide, % as active chlorine | 3.13 | 3.13 |
| Chlorine dioxide, % as chlorine dioxide | 1.19 | 1.19 |
| Final pH | 1.9 | 1.8 |
| Oxidative Extraction State | | |
| Sodium hydroxide applied, % | 1.3 | 1.8 |
| Final pH | 11.2 | 11.3 |
| CEK No. | 2.1 | 2.1 |
| Brightness | 52.4 | 51.1 |
| Viscosity, cp | 14.4 | 14.0 |
| Second Chlorine Dioxide Stage | | |
| Chlorine dioxide, % as chlorine dioxide | 1.0 | 1.25 |
| Final pH | 3.2 | 3.1 |
| Brightness[1] | 86 | 86 |
| Viscosity, cp | 12.7 | 13.1 |

[1]Chlorine dioxide requirement to achieve 86 brightness interpolated from several bleaching experiments.

A laboratory simulation of the bleaching sequence with filtrate recycle as depicted in FIG. 2 was conducted. A mill softwood pulp (Kappa 14.2) taken from the second stage of post oxygen washing, similar to washer 38 in FIG. 2, was bleached using the scheme in FIG. 2. In these runs sodium hydroxide was substituted for oxidized white liquor. Fresh mill pulp from the second post oxygen washer was bleached in repeated runs. Filtrates from each run were saved and applied in the manner shown in FIG. 2 during the succeeding run. This was continued until equilibrium dissolved solids were established in the recycling filtrates. Chlorine dioxide was completely substituted for molecular chlorine in these runs.

Results of metal removal in the acid treatment stage are shown in Table 6. The acid treatment stage was conducted at pH 2. More than 90% of the sodium, magnesium, calcium, and manganese present in the oxygen delignified and washed pulp was removed during acid treatment. Removal of potassium, iron and aluminum was lower, about 88% for potassium, 54% for iron and 65% for aluminum.

Bleach chemicals demand and final brightness achieved during these recycle procedures are shown in Table 7 and are compared to lab bleaching of the same softwood pulp without filtrate recycle. A modest increase in both sodium hydroxide, 0.5%, and chlorine dioxide, 0.25%, was observed for the case of filtrate recycle compared to no filtrate recycle. Targeted brightness of 86 was achieved in both cases and pulp viscosity was similar.

The above-mentioned patents are hereby incorporated by reference.

Many variations of the present invention will suggest themselves to those of ordinary skill in the art in light of the above-detailed description. All such obvious modifications are within the full intended scope of the appended claims.

We claim:

1. A process for bleaching Kraft wood pulp comprising subjecting the wood pulp after brown stock washing to the following steps conducted in sequence:
   oxygen delignification in the presence of oxygen and oxidized white liquor followed by one to two stages of post oxygen washing;
   subjecting the oxygen delignified pulp to an acid treatment at a pH of about 2 to 4 to substantially remove non-process metals and washing the treated pulp with fresh water and discharging at least a portion of the filtrate from said washing to the sewer;
   bleaching in a first chlorine dioxide stage where consistency is maintained from about 9% to 14% and pH is about 2 to 4;
   partially neutralizing pulp, from said first chlorine dioxide bleaching stage, to a pH of 5 to 7 in a neutralization tank with filtrate from a subsequent oxidative extraction stage and with oxidized white liquor;
   thickening pulp on a decker after which oxidized white liquor is added to raise the pH to about 10 to 13 and oxygen and hydrogen peroxide bleaching chemicals are added;
   subjecting the thickened pulp and bleaching chemicals to a hot extraction stage;
   thoroughly washing pulp from said extraction stage with fresh water on two sequential washing stages to minimize the wash volume;
   subjecting said washed pulp to one or two final chlorine dioxide bleaching stages and thoroughly washing pulp after each stage with either fresh water or paper machine white water or a combination of both;
   discharging to sewer the filtrate from said washing, after each said final chlorine dioxide stage;
   using filtrate from said two stage sequential washing stages, after said extraction stage, to dilute and neutralize pulp from said first chlorine dioxide stage of bleaching in said neutralization tank such that filtrate from the extraction stage and the first chlorine dioxide stage are combined with pulp;
   separating the combined filtrates from the pulp on said decker and at least a portion of the filtrate is recycled to the last washer of the post oxygen washing stage as wash water;
   recovering filtrate from said last washer of the post oxygen washing stage in the cooking liquor recovery process by recycling countercurrently through brownstock washing constituting a weak black liquor which is evaporated to produce a strong black liquor;
   combusting said strong black liquor in a recovery boiler to produce a smelt and a flue gas such that chloride from the recovered bleach plant filtrate is preferentially enriched in the flue gas from combustion;
   collecting particles containing chloride and sulfate in said flue gas as ash in an electrostatic precipitator;
   removing chloride and potassium from said ash by either leaching with water or by evaporation crystallization from a water solution to produce a solid stream of sodium sulfate and a salt solution rich in chloride and potassium;
   discharging the salt solution to the sewer or recovering it for its chlorine value;
   mixing said solid sodium sulfate with said strong black liquor prior to combustion in said recovery boiler; and
   dissolving said recovery boiler smelt in water to form green liquor and converting it to pulping liquor in the causticizing process.

2. A process as defined in claim 1 wherein said first chlorine dioxide stage is operated at 2% to 5% consistency after which the pulp is thickened on said decker without washing before entering the oxidative extraction stage and using filtrate from said thickening process to dilute pulp before it enters said first chlorine dioxide bleaching stage whereby all dissolved solids and water entering or generated in the first chlorine dioxide stage passes into the oxidative extraction stage with the pulp from said decker; and wherein all filtrate from said first chlorine dioxide stage and said oxidative extraction stage are recovered by recycling all filtrate from the oxidative extraction stage as wash water to countercurrently wash pulp first on the post oxygen stage washers and then the brownstock washers.

3. A process as defined in claim 2 wherein all filtrates from the bleach plant are recovered by introducing fresh water only on the final chlorine dioxide bleaching stage washer and countercurrently washing pulp from each preceding bleach stage with filtrate from each succeeding bleach stage and continuing this countercurrent pulp washing for post oxygen washing and brownstock washing.

4. A process as defined in claim 1 wherein all filtrates from the bleach plant are recovered by introducing fresh water only on the final chlorine dioxide bleaching stage washer and countercurrently washing pulp from each preceding bleach stage with filtrate from each succeeding bleach stage and continuing this countercurrent pulp washing for post oxygen washing and brownstock washing.

5. A process for bleaching Kraft wood pulp comprising subjecting the wood pulp after brown stock washing to the following steps conducted in sequence:
   oxygen delignification in the presence of oxygen and oxidized white liquor followed by one to two stages of post oxygen washing;
   subjecting the oxygen delignified pulp to a first chlorine dioxide bleaching stage where consistency is maintained at 2% to 5% and pH is about 2 to 4;
   thickening pulp from said first chlorine dioxide tower on a decker, without washing with fresh water, after which oxidized white liquor is added to raise the pH to about 10 to 13 and adding oxygen and hydrogen peroxide bleaching chemicals;
   subjecting the thickened pulp and bleaching chemicals to a hot extraction stage;
   thoroughly washing pulp from said extraction stage with fresh water on two sequential washing stages to minimize the wash water volume;

subjecting said washed pulp to one or two final chlorine dioxide bleaching stages and thoroughly washing pulp after each stage with either fresh water or paper machine white water or a combination of both;

discharging to the sewer the filtrate from said washing, after each said final chlorine dioxide stage;

using a portion of filtrate from said thickening process following said first chlorine dioxide bleaching stage to dilute pulp from said last washer of the post oxygen stage;

treating a portion of said filtrate from said first chlorine dioxide stage washer with sodium hydroxide and sodium carbonate to effect precipitation of metals that enter the bleach plant with the wood fiber;

separating the precipitated material from the aqueous phase by gravity settling or filtration;

disposing the precipitated sludge and using the metal free clarified filtrate to wash pulp on the first chlorine dioxide stage washer to prevent the carryover of metals to the extraction stage whereby all dissolved solids entering or generated in the first chlorine dioxide bleach stage must either pass to the oxidative extraction stage with the pulp or be disposed of with the precipitated metal sludge;

using filtrate from said at least two stage sequential washing stages as wash water to countercurrently wash pulp beginning with the last washer of the post oxygen stage and continuing through brownstock washing which constitutes a weak black liquor;

evaporating said weak black liquor to produce a strong black liquor;

combusting said strong black liquor in a recovery boiler to produce a smelt and a flue gas whereby chloride from the recovered bleach plant filtrate is preferentially enriched in the flue gas from combustion;

collecting particles containing chloride and sulfate in a said flue gas as ash in an electrostatic precipitator;

removing chloride and potassium from said ash by either leaching with water or by evaporation crystallization from a water solution to produce a solid stream of sodium sulfate and a salt solution rich in chloride and potassium;

discharging the salt solution to the sewer or recovered for its chlorine value;

mixing said solid sodium sulfate with said strong black liquor prior to combustion in said recovery boiler; and dissolving said recovery boiler smelt in water to form green liquor and converting it to pulping liquor in the causticizing process.

6. A process as defined in claim 5 wherein said first chlorine dioxide bleaching stage is operated at 9% to 14% consistency after which the pulp slurry is diluted with filtrate from thickening on the succeeding said decker, without washing with fresh water, before entering the oxidative extraction stage; and wherein a portion of said filtrate from said first chlorine dioxide stage thickening process is treated with sodium hydroxide and sodium carbonate to effect precipitation of metals that enter the bleach plant with the wood fiber; and wherein the precipitated material from the aqueous phase is separated by gravity settling or filtration; and wherein the precipitated sludge is disposed of and the metal free clarified filtrate is used to wash pulp on the first chlorine dioxide stage washer to prevent the carryover of metals to the extraction stage whereby all dissolved solids entering or generated in said first chlorine dioxide bleach stage must either pass to the oxidative extraction stage with the pulp or be disposed of with the precipitated metal sludge; and further wherein all filtrates from said first chlorine dioxide stage and said oxidative extraction stage are recovered by recycling all filtrate from the oxidative extraction stage as wash water to countercurrently wash pulp first on the post oxygen stage washers and then the brownstock washers.

7. A process as defined in claim 6 wherein all filtrates from the bleach plant are recovered by introducing fresh water only on the final chlorine dioxide bleaching stage washer and countercurrently washing pulp from each preceding stage with filtrate from each succeeding bleach stage and continuing this counter current pulp washing for post oxygen washing and brownstock washing.

8. A process as defined in claim 6 wherein green liquor is used to effect the metal precipitation from the first chlorine dioxide bleaching stage.

9. A process as defined in claim 6 wherein a combination of green liquor, sodium hydroxide and sodium carbonate is used to effect the metal precipitation.

10. A process as defined in claim 6 wherein the metal precipitate is mixed with said strong black liquor before combustion or added to green liquor for removing metals with grits and dregs.

11. A process as defined in claim 5 wherein all filtrates from the bleach plant are recovered by introducing fresh water only on the final chlorine dioxide bleaching stage washer and countercurrently washing pulp from each preceding stage with filtrate from each succeeding bleach stage and continuing this counter current pulp washing for post oxygen washing and brownstock washing.

12. A process as defined in claim 11 wherein green liquor is used to effect the metal precipitation from the first chlorine dioxide bleaching stage.

13. A process as defined in claim 11 wherein a combination of green liquor, sodium hydroxide and sodium carbonate is used to effect the metal precipitation.

14. A process as defined in claim 11 wherein the metal precipitate is mixed with said strong black liquor before combustion or added to green liquor for removing metals with grits and dregs.

15. A process as defined in claim 5 wherein green liquor is used to effect the metal precipitation from the first chlorine dioxide bleaching stage.

16. A process as defined in claim 15 wherein the metal precipitate is mixed with said strong black liquor before combustion or added to green liquor for removing metals with grits and dregs.

17. A process as defined in claim 5 wherein a combustion of green liquor, sodium hydroxide and sodium carbonate is used to effect the metal precipitation.

18. A process as defined in claim 17 wherein the metal precipitate is mixed with said strong black liquor before combustion or added to green liquor for removing metals with grits and dregs.

19. A process as defined in claim 5 wherein the metal precipitate is mixed with said strong black liquor before combustion or added to green liquor for removing metals with grits and dregs.

* * * * *